US011858793B2

(12) United States Patent
Seigneur

(10) Patent No.: US 11,858,793 B2
(45) Date of Patent: Jan. 2, 2024

(54) THRUST LIFTING DEVICE

(71) Applicant: SERAPID—FRANCE, Rouxmesnil-Bouteilles (FR)

(72) Inventor: Ivan Seigneur, Dieppe (FR)

(73) Assignee: SERAPID- FRANCE, Rouxmesnil-Bouteilles (FR)

( * ) Notice: Subject to any disclaimer, the term of this patent is extended or adjusted under 35 U.S.C. 154(b) by 619 days.

(21) Appl. No.: 16/756,568

(22) PCT Filed: Oct. 16, 2018

(86) PCT No.: PCT/FR2018/052562
§ 371 (c)(1),
(2) Date: Apr. 16, 2020

(87) PCT Pub. No.: WO2019/077254
PCT Pub. Date: Apr. 25, 2019

(65) Prior Publication Data
US 2020/0239289 A1 Jul. 30, 2020

(30) Foreign Application Priority Data

Oct. 17, 2017 (FR) ...................................... 1759740

(51) Int. Cl.
*B66F 7/06* (2006.01)
*B66F 3/06* (2006.01)
*F16G 13/20* (2006.01)
(52) U.S. Cl.
CPC .............. *B66F 7/0666* (2013.01); *B66F 3/06* (2013.01); *F16G 13/20* (2013.01); *B66F 2700/03* (2013.01)

(58) Field of Classification Search
CPC ........ F16G 13/20; F16H 19/0636; B66F 3/06; B66F 7/0666; B66F 13/005; B66F 2700/03
See application file for complete search history.

(56) References Cited

U.S. PATENT DOCUMENTS 1,916,517 A 7/1933 Long
6,224,037 B1 5/2001 Novick
(Continued)

FOREIGN PATENT DOCUMENTS

AU 2010212303 A1 4/2011
CN 206328091 U1 7/2017
(Continued)

*Primary Examiner* — Mahdi H Nejad
(74) *Attorney, Agent, or Firm* — Volpe Koenig

(57) ABSTRACT

A thrust lifting device that is able to transmit a thrust force for lifting loads, includes at least one articulated lift column provided with at least one meshing part, and with at least one arm directed upward from the meshing part, the lift column made up of links with a link of rank 1 at the upper end of the upwardly directed arm and running links of rank n, where n is between 2 and N, the number of links of the lift column, —at least one rotary pinion driving the lift column by the meshing part meshing with the pinion, —at least one arm opposite the upwardly directed arm and formed by resting links, the resting links being able to pass to the meshing part and to the upwardly directed arm by rotation of the pinion, and —at least one stabilizer that is movable along the upwardly directed arm.

19 Claims, 6 Drawing Sheets

(56) References Cited

U.S. PATENT DOCUMENTS

| | | | |
|---|---|---|---|
| 8,336,286 B2* | 12/2012 | Veltrop | ............... F16G 13/20 |
| | | | 222/113 |
| 9,797,196 B2* | 10/2017 | Taggart | ............... E21B 19/083 |
| 9,970,517 B2* | 5/2018 | Irwin | ............... E05D 3/04 |
| 10,378,611 B2 | 8/2019 | Seigneur et al. | |
| 2009/0008615 A1 | 1/2009 | Young et al. | |
| 2012/0261629 A1 | 10/2012 | Andkjar | |
| 2018/0149304 A1* | 5/2018 | Allen | ............... F16G 13/20 |
| 2018/0216703 A1* | 8/2018 | Etori | ............... B66F 13/005 |
| 2019/0169003 A1* | 6/2019 | Benz | ............... B66F 7/00 |
| 2021/0070591 A1* | 3/2021 | Castronuovo | ............ B66F 3/06 |

FOREIGN PATENT DOCUMENTS

| | | | |
|---|---|---|---|
| DE | 679356 C | | 8/1939 |
| FR | 2 345 626 A1 | | 10/1977 |
| FR | 2 573 832 A1 | | 5/1986 |
| FR | 2 780 472 A1 | | 12/1999 |
| FR | 2 786 476 A1 | | 6/2000 |
| FR | 3 043 747 A1 | | 5/2017 |
| GB | 1534726 A | | 12/1978 |
| JP | 2000191289 A | | 7/2000 |
| JP | 2004018163 A | | 1/2004 |
| JP | 2009269751 A | * | 11/2009 |
| JP | 2013216475 A | | 10/2013 |
| JP | 2014234904 A | | 12/2014 |
| JP | 2015218005 A | | 12/2015 |
| WO | 2014196229 A1 | | 12/2014 |

* cited by examiner

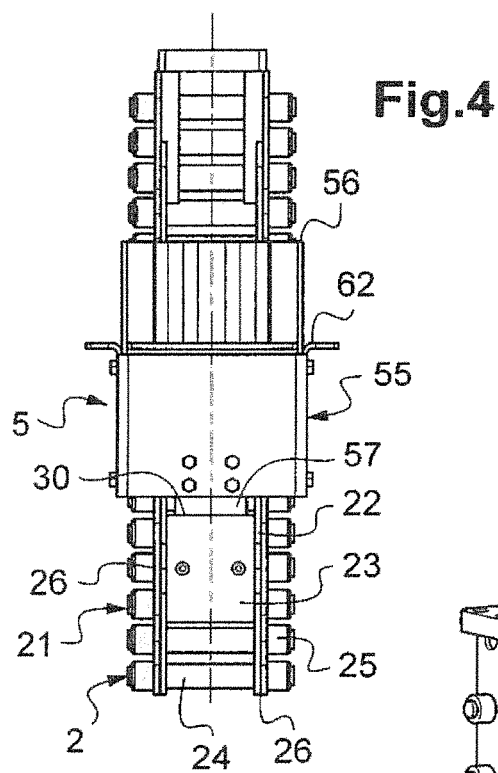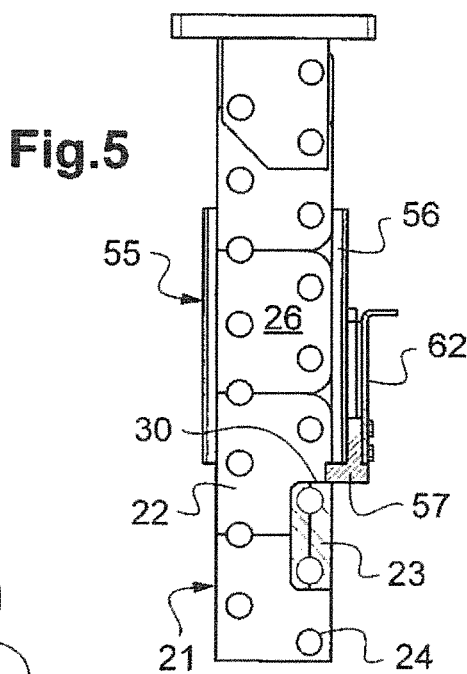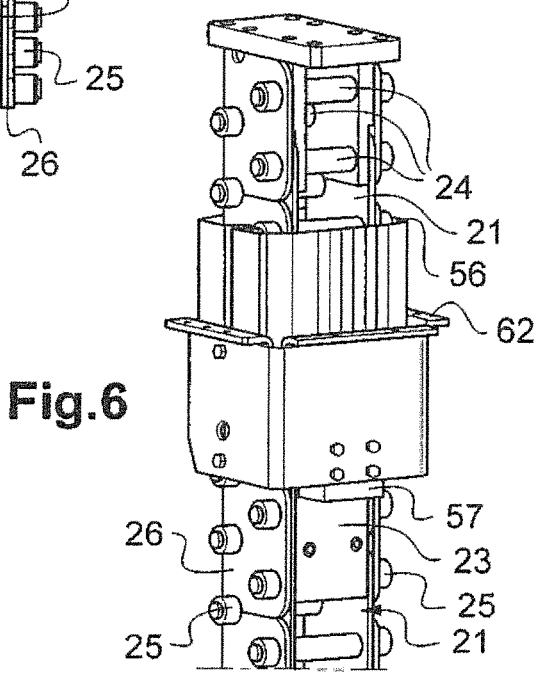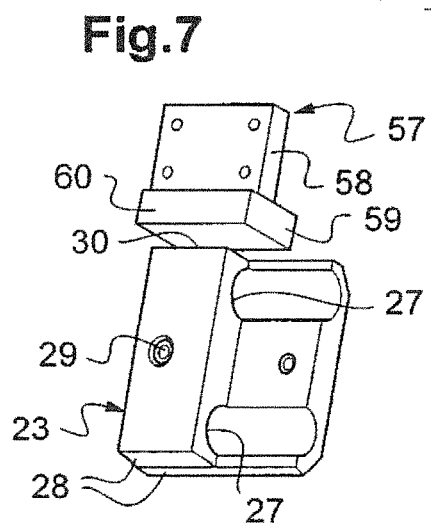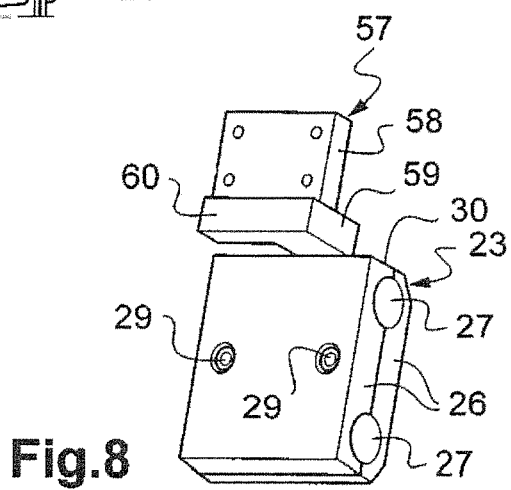

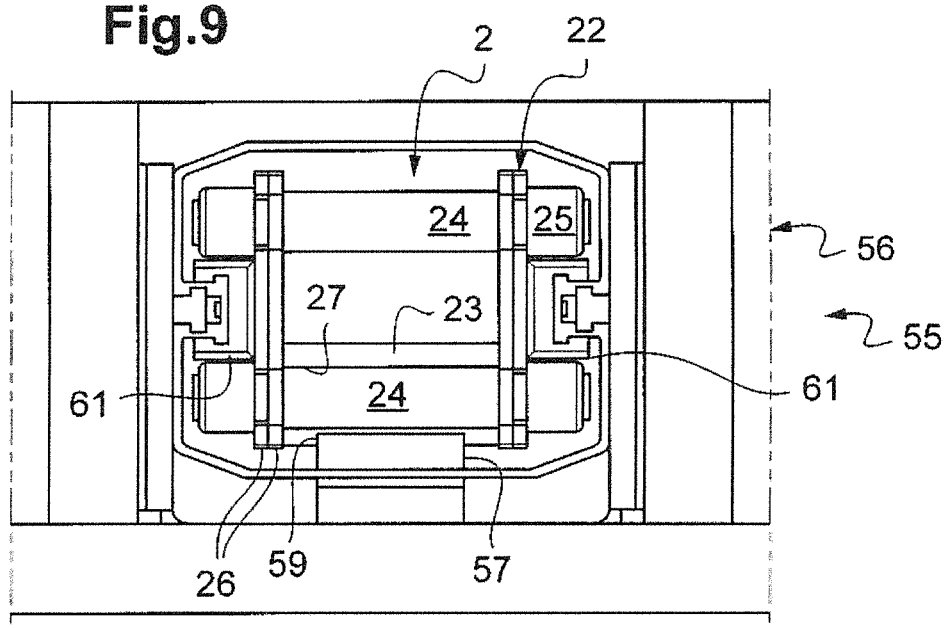
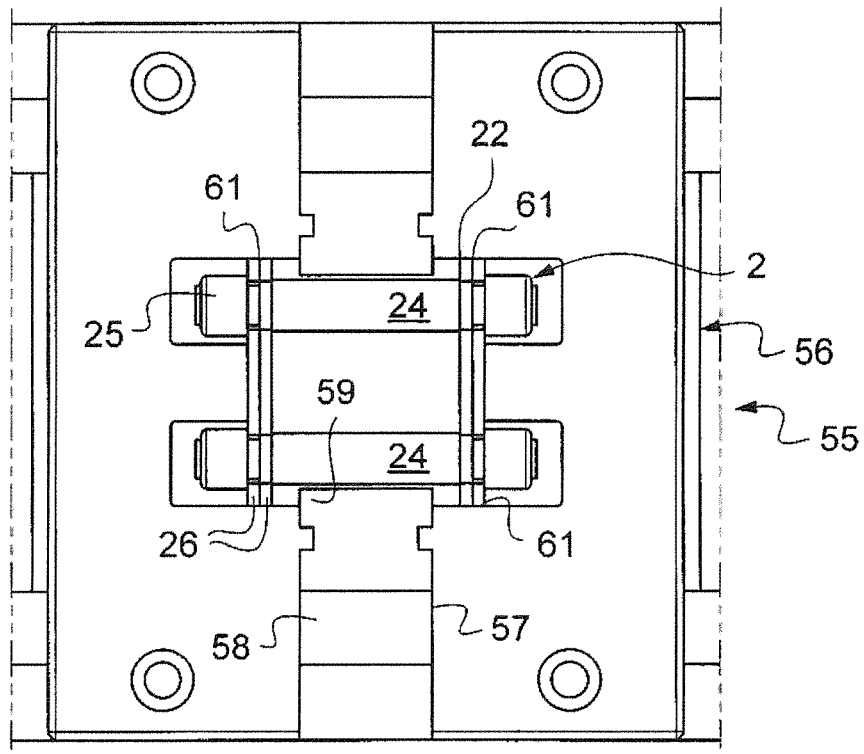

THRUST LIFTING DEVICE

FIELD OF THE INVENTION

The invention relates to machinery for lifting loads by thrust.

BACKGROUND

In many applications, the lifting of a load is demanded without the lifting able to be carried out via traction, in particular by a cable or a belt of the lift type. The lifting is carried out by thrust. Moreover, the size of a cylinder greater than double the stroke thereof makes the implementation thereof undesirable or impossible in a large variety of situations.

Recourse is then had to one or more thrust chains provided to operate under compression and therefore to resist bowing. Such thrust chains are adapted to show rooms to reconfigure the decoration or the arrangement of the room, to stadiums that can accommodate several tens of thousands of person and that require rapid transformations between a sports, musical, social, etc. use.

Moreover, the applicant has pushed back the technological limits of thrust chains, particularly in terms of the stroke corresponding to the height between the low position and the high position of the element supported by the thrust chain, in general a platform.

Bowing is a phenomenon of instability of a structure which when subjected to a compression force has a tendency to bend in a direction perpendicular to the compression axis. Euler's formula establishes that the maximum load of a thrust chain is proportional to the Young's modulus of the material of the thrust chain, to the second moment of area of the thrust chain and inversely proportional to the square of the length of the chain subjected to compression. The Young's modulus of the materials is a relatively stable parameter in defined economic conditions. The thrust chain is in general made of steel for the portions thereof subjected to substantial stresses.

Any increase in the second moment of area results in an increase in the size of the chain and consequently in the size of the entire device in the low position. An increase in the second moment of area also results in a higher chain mass, longer mounting, a drive mechanism and a chain that are more expensive.

In practice for a given thrust chain, these constraints result in a load that decreases quickly when the stroke increases.

The invention improves the situation.

SUMMARY

The invention proposes a thrust lifting device able to transmit a thrust force making it possible to lift a load, comprising at least one articulated lift column provided with at least one meshing part and with at least one arm directed upward from the meshing part, the lift column being made up of links with a link of rank 1 at the upper end of the upwardly directed arm and running links of rank n, with n comprised between 2 and N the number of links of the lift column, at least one rotary pinion driving the lift column by said meshing part meshing with the pinion, at least one arm opposite the upwardly directed arm and formed by resting links, said resting links being able to pass to the meshing part and to the upwardly directed arm by rotation of the pinion, and at least one stabilizer that is movable along the upwardly directed arm. The movable stabilizer determines the position of the lift column in a horizontal plane at the height at which said movable stabilizer is located. The free length, and consequently subject to bowing, of the lift column is reduced.

In an embodiment, the movable stabilizer stabilizes the lift column in position in the horizontal plane and in orientation. In other terms, in the zone in which the stabilizer acts on the lift column, the lift column has a nominal position and a nominal derivative of the position equal to zero. In said zone, the lift column is therefore located in the desired position and oriented in the axis of the lift column.

In an embodiment, each movable stabilizer comprises one ring per lift column and a frame rigidly connecting the rings. Thus, the lift columns of a device are stabilized by the stabilizer or stabilizers. The relative positions thereof are locally fixed in a horizontal plane.

In an embodiment, said ring comprises a sliding member with respect to the corresponding lift column and a stabilizer finger for driving the movable stabilizer in motion. The stabilizer finger can be bearing on the corresponding lift column. Thus provided are both a freedom of sliding and a driving. The freedom of sliding can be taken advantage of to allow for a free sliding over a portion of the stroke at least equal to half the total stroke in the case of a single stabilizer, a third of the stroke in the case of two stabilizers themselves spaces a third of the total stroke, etc.

As the stabilizer is driven by the lift columns, it is possible to dispense with an additional motorization.

In an embodiment, the sliding member forms a link guide, in contact with two links. Thus, two successive links are stabilized in the two axes of a horizontal plane giving a stabilization in position and in orientation. In other terms, the stabilizer provides the nominal position of the two links with which it interacts and the parallelism of the axis of said links with the axis Z for the link of rank n and for the link of rank n+1.

In an embodiment, the sliding member forms a link roller guide. The sliding member can thus cooperate with link rollers, for example disposed at the ends of the bars connecting the links. In the case of free rotating rollers, the friction is reduced. Preferably, the sliding member is in contact with at least three rollers.

In an embodiment, the sliding member is disposed between two rows of rollers coming into contact with opposite surfaces of the sliding member.

In another embodiment, the sliding member is disposed on either side of a row of rollers, for example by two surfaces facing each other, in particular in the case of a single row of rollers.

In an embodiment, the sliding member forms a link cheek guide. The sliding member can be in contact with two links over a portion of the height of each one of the two links.

In another embodiment, the sliding member forms a column pad guide. The pads are fastened to the links or to the bars of the links. The pads can be protruding beyond the link bars.

In an embodiment, each movable stabilizer comprises at least one damper per lift column. The damper reduces the acceleration of the stabilizer when the stabilizer finger comes into contact with the lift column.

In an embodiment, each movable stabilizer comprises at least one damper reducing the acceleration of the stabilizer when the stabilizer arrives in the low position. It is thus possible to operate at a substantially constant speed over most of the stroke of the device. It is possible to dispense with a reduction in the speed, upwards or downwards when the stabilizer is brought upwards by the lift column or is deposited in the low position. The same damper can be operational for the stabilizer finger to come into contact with the lift column and the arrival of the stabilizer in the low position.

In an embodiment, each lift column comprises one tappet per movable stabilizer. The tappet is able to support the movable stabilizer by a stabilizer finger.

In an embodiment, the tappet is supported by at least two link bars. Each tappet can be fastened to links of an equal rank for the same movable stabilizer in the case of a plurality of lift columns. The tappet can be supported by two link bars located between the link cheeks according to one direction while still protruding in relation to the cheeks according to a second direction perpendicular to the first in a horizontal plane. Thus, the links devoid of tappets remain at a distance from the stabilizer finger. The tappet, coming closer to the stabilizer ring, lifts the stabilizer and supports the stabilizer finger.

In an embodiment, each lift column comprises at least two tappets. The tappets of each lift column are disposed with an offset in a horizontal plane in such a way that a first tappet supports a first finger having passed next to a second finger and that a second tappet supports the second finger. The first and second tappets are disposed at different locations of the lift column, for example associated with the links of rank N/3 and 2N/3 in the case of two tappets and of two stabilizers.

In an embodiment, each movable stabilizer is guided by at least one guide rail of a platform of the lifting device. The guide rail providing for the guiding of the platform of the device also provides the guiding of the movable stabilizer. The movable stabilizer can be provided with pads or with rollers that cooperate with the guide rail. The stabilizer, regardless of its position in lifting, is in a determined position in X and in Y.

In another embodiment, the device comprises a lower pair of scissor supports and an upper pair of scissor supports, the movable stabilizer being mounted between said pairs of scissor supports. Thus, the movable stabilizer is displaced at a speeds determined by the speed of the lift columns and substantially equal to half the speed of the lift columns while still providing for the stabilization thereof.

In an embodiment, the device comprises at least one arm opposite the upwardly directed arm and formed by resting links. Said resting links are able to pass to the meshing part and to the upwardly directed arm by rotation of the pinion. Said opposite arm stores the resting links. The storage can be linear or be in a wound manner.

In an embodiment, the link comprises two symmetrical cheeks, of generally rectangular shape and connected by link bars forming an axis.

In an embodiment, the cheek is:
a simple flat superimposed in thickness,
a pressed flat with an offset in thickness, or
a machined part.

In an embodiment, the device comprises at least two articulated lift columns each provided with at least one meshing part and with at least one arm directed upward from the meshing part, each lift column being made up of links with a link of rank 1 at the upper end of the upwardly directed arm and running links of rank n, with n comprised between 2 and N the number of links of the lift column, at least two rotary pinions each driving one of said lift columns by said meshing part meshing one of said pinions, at least two arms opposite the upwardly directed arms respectively, and formed from resting links, said resting links being able to pass to the meshing parts and to the upwardly directed arms by rotation of the pinion, and at least one movable stabilizer along said upwardly directed arms.

In an embodiment, each movable stabilizer is disposed in the vicinity of the link of rank B/(p+1) or of multiple rank of B/(p+1), in the high position of the lifting device, with B the number of links of the upwardly directed arm in the high position of the lifting device and p the number of movable stabilizers. Preferably, p=1, 2 or 3.

It is thus possible to double, triple and even quadruple the stroke height of a lifting device.

BRIEF DESCRIPTION OF THE DRAWINGS

Other characteristics, details and advantages of the invention, shall appear when reading the detailed description hereinafter, and the accompanying drawings, wherein:

FIG. 4 is a front view in elevation, a portion of lift columns passing in a stabilizer ring, FIG. 5 is a cross-section view according to V-V of FIG. 4, FIG. 6 is a perspective view corresponding to FIGS. 4 and 5, FIGS. 7 and 8 are detailed views in perspective of two tappets and of two stabilizer fingers, FIG. 9 is a diagrammatical cross-section view in a horizontal plane of a lift column passing in a stabilizer ring, FIG. 10 is a view similar to FIG. 9 with another type of stabilizer ring.

DETAILED DESCRIPTION OF THE PREFERRED EMBODIMENTS

The drawings and the description hereinafter contain, for the most part, elements of a certain nature. They can therefore not only be used to understand the present invention better, but also contribute the definition thereof, where applicable.

The invention can apply to different types of lift columns, in particular including links according to AU 2010212303, US 2009/008615, FR 2 573 832, FR 2 345 626, FR 2 786 476 or FR 2 780 472 as well as FR 3 043 747 to which the reader is invited to refer to.

The thrust chains in applications of great height tend to bow. Bowing is a lateral displacement of the substantially vertical thrust chain. The bowing according to the axis of the chain links can be limited by a tight adjustment of the elements of the chain. The bowing perpendicular to the axis of the chain links is critical due to the aptitude of the chain to be folded from one link to the other.

In order to counteract the bowing, the Applicant has developed a thrust lifting device 1 shown in the figures. The lifting device 1 is able to transmit a thrust force allowing for the lifting of loads.

Figure 1:
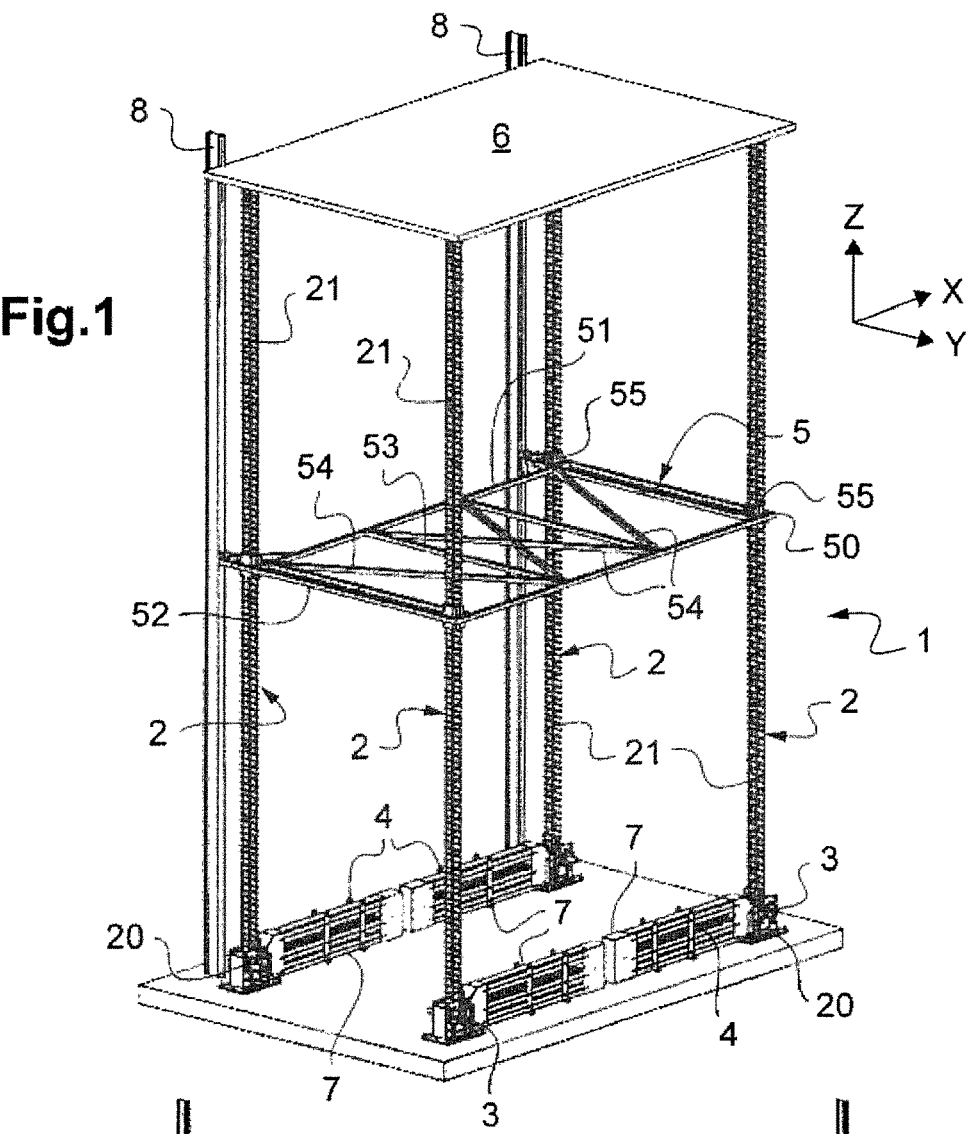
FIGS. 1 to 3 are views in perspective of a lifting device according to an aspect of the invention respectively in the high, intermediate and low position.
Figure 2:
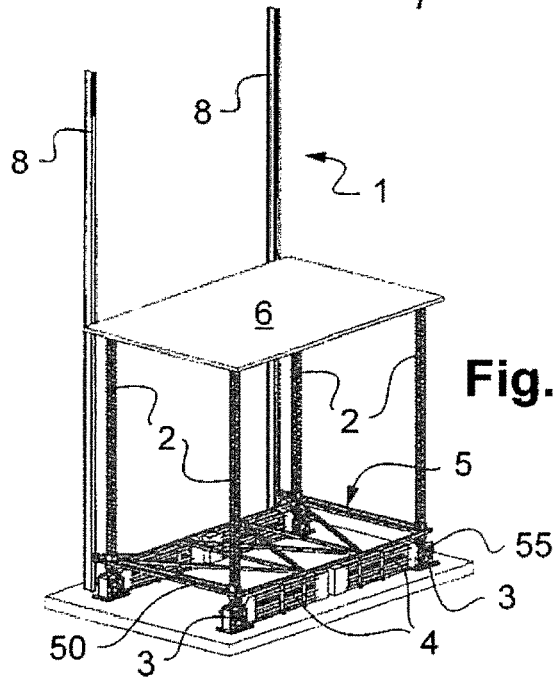
Figure 3:
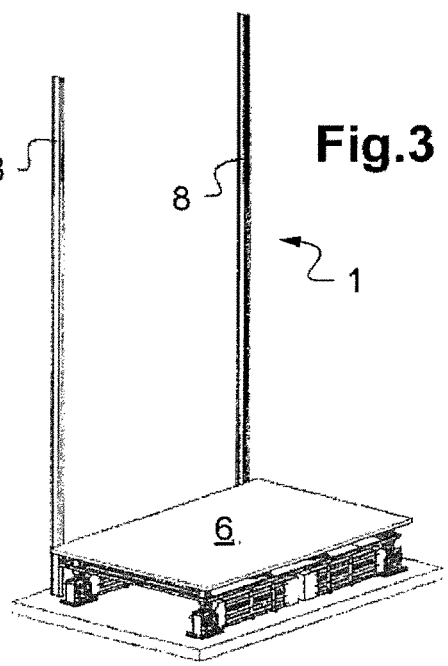

In the embodiment shown in FIGS. 1 to 3, the lifting device 1 comprises four articulated lift columns 2, four rotary pinions 3 each driving one of said lift columns 2, four opposite arms 4, and a movable stabilizer 5. The lift columns 2 support a plateau 6, for example a plateau of a show room. The lifting device 1 rests on a base.

Each lift column 2 is provided with at least one meshing part 20, and with at least one arm 21 directed upward from the meshing part 20. The lift column 2 is made up of links 22 with a link of rank 1 at the upper end of the upwardly directed arm 21 and running links of rank n, with n comprised between 2 and N the number of links 22 of the lift column 2. The running links of rank n are part either of the meshing part 20, or of the upwardly directed arm 21, according to the position of the lift column 2 in lifting.

For example, in the low position, the link of rank 3 is in the meshing part 20 and passes to the upwardly directed arm 21 rapidly after the beginning of the lifting; in the low position, the link of rank N−3 is in the opposite arm 4 and passes to the meshing part 20 then to the upwardly directed arm 21 near the end of the lifting.

The pinion 3 is in constant meshing connection with said meshing part 20. The meshing part 20 can be straight, for example aligned on the upwardly directed arm 21, or, preferably, rounded hugging the shape of the pinion 3. The pinion 3 is driven by an electric motorization, optionally with reducer, or hydraulic motorization.

The arm 4 opposite the upwardly directed arm 21 is formed by resting links 22. The resting links 22 are able to pass to the meshing part 20 then to the upwardly directed arm 21 by rotation of the pinion 3 in the direction of the lifting. The active links 22 i.e. subjected to compression, are able to pass to the meshing part 20 then to the opposite arm 4 by rotation of the pinion 3 in the direction of descent.

The opposite arm 4 is housed in a magazine 7. The magazine 7 is, more preferably, horizontal. The four magazines 7 can be disposed on two parallels, the end of a first magazine 7 opposite a first pinion 3 facing the end of a second magazine 7 opposite a second pinion 3. Each magazine 7 can contain the resting links 22 on one row or, preferably, several rows with folding at the end of the row. The resting links 22 can form a flattened spiral. For a low maneuvering height, the resting links 22 can form a straight segment.

The stabilizer 5 is movable along the upwardly directed arms 21. The movable stabilizer 5 is able to stabilize the lift column 2 in position in the horizontal plane and in orientation. The stabilizer 5 has the form of a spaced frame 50. The stabilizer 5 can be mechanically welded.

Here, the stabilizer 5 comprises a rectangular frame 50 with two side members 51 and two cross-members 52; two intermediate spacers 53 parallel to the cross-members 52 and equally spaced; and four diagonal legs 54, one extending from an end cross-member 52 to an intermediate spacer 53, the second extending from the opposite end cross-member 52 to the opposite intermediate spacer 53 and the third and fourth crossing in an X between the two intermediate spacers 53. Two crossed Vs are formed. The frame 50 has a size low in height, defined by the height of the beams that form it, and a low mass.

Each movable stabilizer 5 comprises one ring 55 per lift column 2. The frame 50 rigidly connects the rings 55. Each ring 55 comprises a sliding member 56 with respect to the corresponding lift column 2 and a stabilizer 5 finger 57 for driving the movable stabilizer 5 in motion.

The stabilizer finger 57 is bearing on the corresponding lift column 2 in the position of FIG. 1, which is with maximum lift. The stabilizer finger 57 is inactive in the position of FIG. 3, in the low position.

In the position of FIG. 2, a mid-stroke, the stabilizer finger 57 makes contact on the corresponding lift column 2 while the stabilizer 5 is still in the low position. In the position of FIGS. 2 and 3, the movable stabilizer 5 rests on the frames also supporting the pinions 3. Thus, during the first portion of the rising stroke, the movable stabilizer 5 remains in the low position, and during the second portion of the rising stroke, the movable stabilizer 5 rises at the same speed as the plateau 6.

In the embodiment shown, the stabilizer 5 is at rest on the first half of the stroke of the lift column 2 and is supported in the vicinity of the link of rank N/2±1 on the second half of said stroke.

The finger 57 has the shape of an inverted T with an asymmetric bar. The foot 58 of the T is fastened to the ring 55, here by screws. The large portion 59 of the bar of the T passes under the ring 55 while being able to directly transmit a compression force, thus relieving the screws. The large portion 59 of the bar of the T is protruding between the link 22 cheeks 26 along a direction perpendicular to the axes of the bars 24 while remaining distant from the bars 24. The large portion 59 of the bar of the T interferes with a tappet 23 according to the respective positions of said large portion and of said tappet 23 along the axis of the bars 24.

In FIG. 7, the large portion 59 of the bar of the T substantially occupies the space between the inside cheeks of links 22 in such a way as to substantially intercept any tappet 23 during mounting. In FIG. 8, the large portion 59 of the bar of the T substantially occupies half the space between the inside cheeks of links 22 in such a way as to intercept a corresponding tappet 23 and to allow to pass a non-interfering tappet 23, for another stabilizer, such as the tappet 23 of FIG. 7, during mounting.

The small portion 60 of the bar of the T is protruding a few millimeters, cf. FIG. 5. The small portion 60 of the bar of the T is protruding from the thickness of a ring 55 collar 62 in such a way as to directly transmit to the lower end of the collar 62 a compression force.

The sliding member 56 can comprise pads 61 made from a material with a low friction coefficient.

The sliding member 56 forms a sheath or guide of links 22, in contact with two links 22. The height of the sliding member 56 greater than the height of a link 22 makes it possible to provide for the position of two links 22 in X and in Y and according to the angles (X^Z) and (Y^Z). In other terms, the position in the horizontal plane and the vertical orientation of two links 22. Said two links 22 cooperating with the sliding member 56 are of rank N/2±1 in the case of a stabilizer, of ranks N/3±1 and 2N/3±1 in the case of two stabilizers, etc.

The ring 55 surrounds the upwardly directed arm 21 of the lift column 2 on the four sides. The ring 55 comprises a folded collar 62 opposite the upwardly directed arm 21. The collar 62 is horizontal. The collar 62 is provided with fastening holes for the frame 50. The ring 55 extends, cf. FIG. 5, over a height greater than the height of two links 22. More precisely, the ring 55 extends from the middle bar 24 of a link of rank n to the lower bar 24 of the link of rank n+2.

The lift column 2 is formed from links 22 articulated on bars 24 provided with rollers 25, cf. FIGS. 4 to 6. The rollers 25 are provided to come into contact with the pinion 3. The links 22 comprise cheeks 26 disposed symmetrically with respect to a central plane. The cheeks 26 are identical to one another. The cheeks 26 are of a substantially constant thickness perpendicularly to the main plane thereof.

Here, the cheeks 26 have the form of flats with a generally rectangular shape, with rounded corners towards the pivot axis. The cheeks 26 are formed from simple flats superimposed in thickness. Alternatively, the cheeks 26 are formed from flats with an offset in thickness formed at the press or from machined parts.

Holes and notches are arranged in the flats for the mounting of bars. The cheeks 26 are disposed in two rows of outside cheeks and two rows of inside cheeks in contact. The cheeks 26 bear against one another by their edge perpendicular to the axis of the column 2. The cheeks 26 are provided with two holes on the side of the pivot axis and one hole and two notches opposite the pivot axis. Two notches of two superimposed cheeks form the equivalent of a hole and allow a bar 24 to pass. The bars 24 are disposed staggered viewed from the side, cf. FIG. 5. The outside cheeks are offset by a cheek half-height in relation to the inside cheeks.

The rollers 25 can be disposed on ends of the bars 24 beyond the links 22. The sliding member 56 forms a link roller guide, preferably in contact with at least three rollers 25. The freedom of rotation of rollers 25 is taken advantage of, not only to cooperate with the corresponding pinion 3, but also with the corresponding sliding member 56.

The sliding member 56 is disposed between two rows of rollers 25 or on either side of a row of rollers 25, cf. FIG. 9.

The sliding member 56 forms a link cheek guide, cf. FIG. 10. The sliding member 56 is in contact with two links 22 over a portion of the height of each one of the two links 22.

Alternatively, the sliding member 56 is in contact with a column pad guide, the pads being fastened to the links 22 or to the link bars 24.

Figure 11:
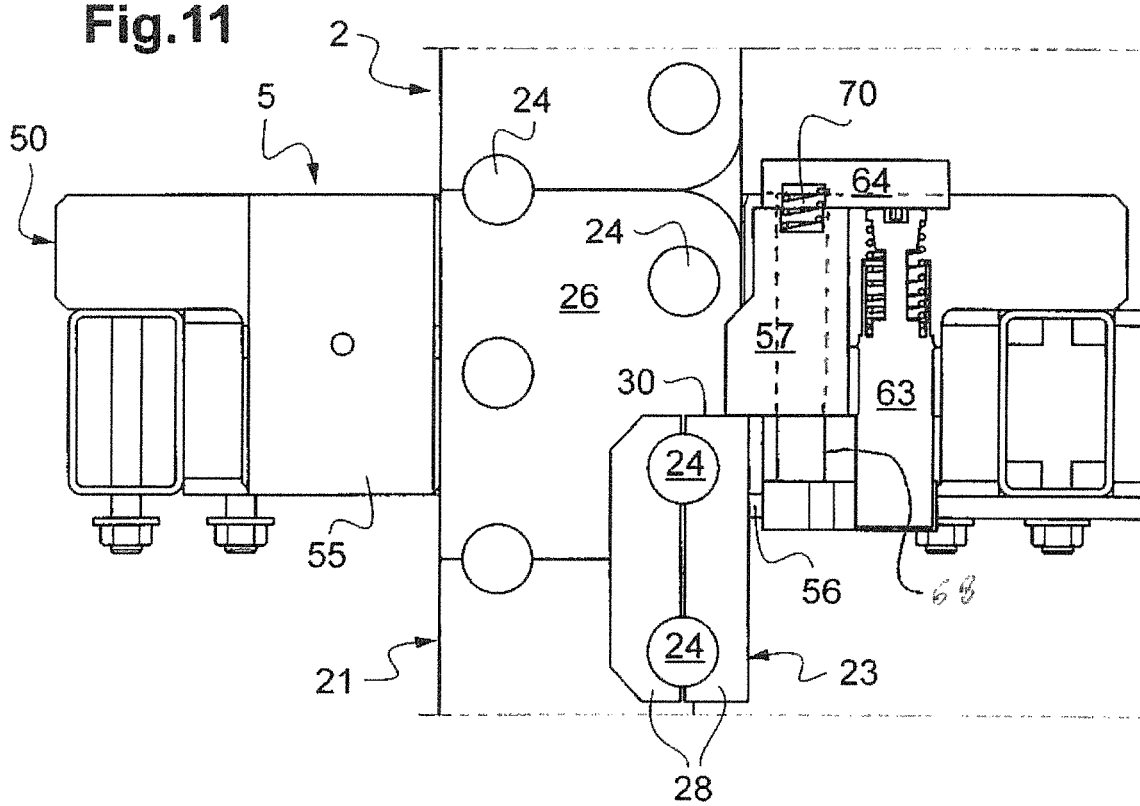
FIG. 11 is a partial diagrammatical cross-section view of a stabilizer provided with a damper.

In the embodiment of FIG. 11, the movable stabilizer 5 comprises a damper 63, cf. FIG. 11, by lift column 2. The damper 63 is disposed between the stabilizer finger 57 on the one hand and the sliding member 56. The finger 57 is slidably mounted according to the axis Z with respect to the sliding member 56. The sliding of the finger 57 is produced along a rail 68. The rail 68 is fastened to the ring 55. The rail 68 is mounted along the axis Z. The rail 68 is disposed in the size in height of the ring 55. The damper 63 is disposed parallel to the finger 57.

The damper 63 is connected to the finger 57 by a bracket 64 fastened to the finger 57 in an upper zone of the sliding member 56. The bracket 64 covers the damper 63 and is fastened to an upper end of the damper 63. A lower end of the damper 63 is fastened to the sliding member 56. The bracket 64 and the finger 57 are slidably mounted. A spring 70 is disposed between the bracket 64 and the finger 57, for example in blind holes arranged in the bracket 64 and the finger 57. In the driving position of the stabilizer 5, the spring 70 is compressed. In the low position of the stabilizer 5, the finger 57 is distant from the tappet 23 and the spring 70 is relaxed.

When the tappet 23 encounters the finger 57, by the upper surface 30 thereof, the finger 57 can be displaced with respect to the sliding member 56 with dampening of said displacement by the damper 63.

In the case of several movable stabilizers, one damper 63 is provided per lift column 2 and per movable stabilizer 5. The damper 63 reduces the acceleration of the stabilizer 5 when the stabilizer finger 57 comes into contact with the lift column 2. The forces and the mechanical vibrations in the lift column 2 and in the pinion 3, and the noise are reduced.

In the absence of such a damper, the finger 57 is permanently fastened to the ring 55.

Each movable stabilizer 5 comprises at least one active damper in the vicinity of the low position. The low position damper reduces the acceleration of the stabilizer 5 at the arrival of the stabilizer in the low position. The mechanical vibrations and the noise are reduced.

Figure 18:
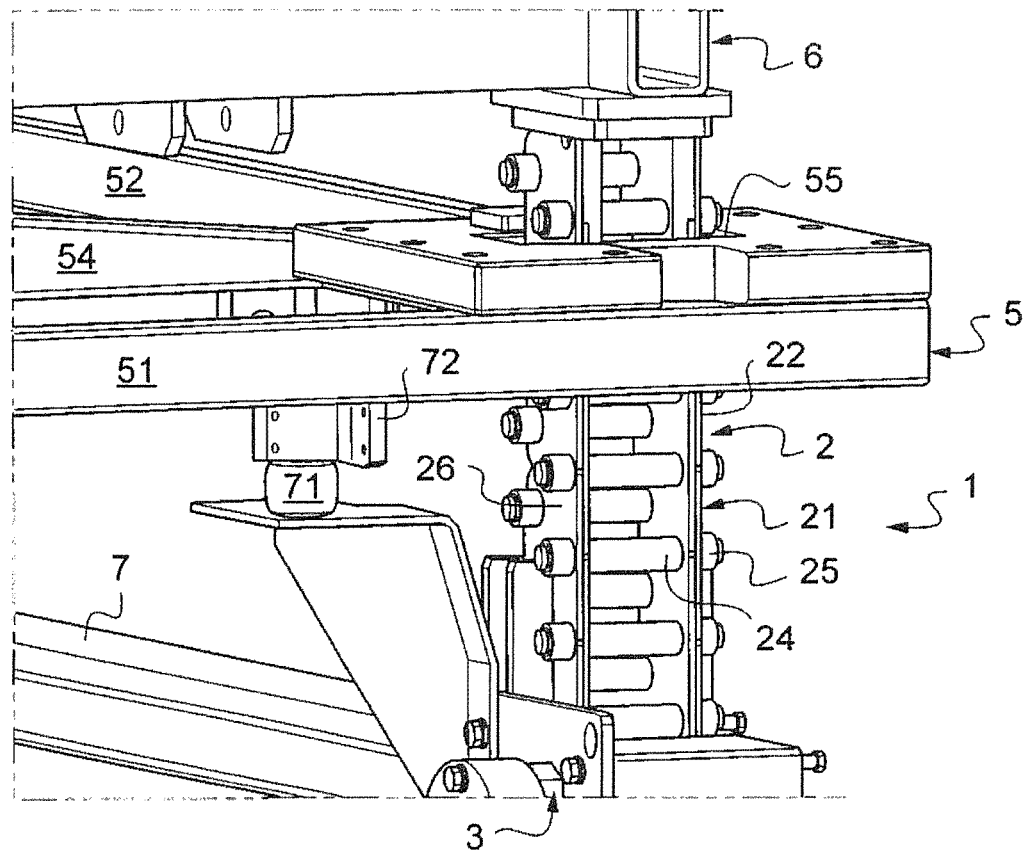
FIG. 18 is a detailed view in perspective of a stabilizer in the low position.

As shown, the damper 63 is also during the arrival of the stabilizer 5 in the low position. To this effect, see FIG. 18, the frame 50 is provided with a lower damper 71 directed downwards. The damper 71 is provided to cooperate with a corresponding surface of a stationary portion of the device 1. Said surface can be horizontal. Said surface can be formed from an upwardly directed arm. The damper 71 can be connected to a plate 72 fastened, for example screwed, to the frame 50. The damper 71 can be made up of a block of elastomer material. When the tappet 23 drives the finger 57 to lift the stabilizer 5, the damper 71 is separated from the stationary surface. During the descent of the stabilizer 5, the damper 71 stamps the stationary surface. The tappet 23 moves away from the finger 57. The mass of the stabilizer 5 rests on the damper 71. The column 2 is not concerned with the mass of the stabilizer 5. The downward docking of the stabilizer 5 is dampened.

Each lift column 2 comprises one tappet 23 per movable stabilizer 5. The tappet 23 is able to support said movable stabilizer 5, in particular by bearing on a stabilizer finger 57. The tappet 23 is integral with the upwardly directed arm 21 of the lift column 2. The tappet 23 is fastened to at least one axis of links.

As shown in FIGS. 4 to 8, the tappet 23 is supported by two link bars 24 that belong to the same row. The row of bars 24 is next to the pivot axis of the links. Each tappet 23 is fastened to links 22 of an equal rank for the same movable stabilizer 5 in the case of at least two lift columns 2.

The tappet 23 has a general parallelepiped rectangular shape with a main dimension in the direction of the height, a secondary dimension in the direction of the axes of the bars 24, and a third dimension in the direction perpendicular to the axes of the bars 24. Chamfers are arranged on the horizontal edges facing the other row of bars 24, distal from the pivot axis of the links, in this case.

The tappet 23 has an upper surface 30 disposed parallel to the plane XY. The upper surface 30 has a clear edge, i.e. with a low connection fillet radius, with a surface of the tappet 23 flush with the edges of links 22. The upper surface 30 forms a support for the stabilizer 5 in a position other than the low position.

The tappet 23 has two through-holes 27 is each one of which passes a link bar 24. The tappet 23 is disposed between two link cheeks 26. The tappet 23 is flush with edges of link cheeks, retaining the size of the lift column 2. The tappet 23 is mounted on the side of the lift column 2 opposite the pinion 3.

The tappet 23 comprises, here, two parts 28 of similar shape separated by a plane passing through the axes of the two bars 24 engaged with the tappet 23. Said parts 28 are in contact by said plane. Said parts 28 are in contact between the two bars 24, and beyond each bar 24. Said parts 28 are maintained together. Said parts 28 are tightened by at least one screw 29 that passes in a smooth through-hole of one of the parts and engages with a tapped hole of the other part.

In the embodiment of FIG. 7, one of said parts has a smaller width that the other part, in the direction of the axis of the bars 24. In coordination with the shape of the stabilizer fingers, this allows the tappet 23 of FIG. 7 to lift the finger 57 of FIG. 7 and to pass next to the finger 57 of FIG. 8. The tappet 23 of FIG. 7 is capable of remaining inactive on a finger 57 of a lower stabilizer and to lift a finger 57 of an upper stabilizer, in the case of two stabilizers. The two stabilizers 5 are superimposed in the low position and spaced in the high position.

In the embodiment of FIG. 8, said parts 28 have an equal width, in the direction of the axis of the bars 24. The tappet 23 is provided to support a single stabilizer 5 or a lower stabilizer 5.

Each lift column 2 comprises at least two tappets 23. The tappets 23 of each lift column 2 are disposed with an offset in a horizontal plane in such a way that a first tappet 23 supports a first finger 57 after having passed next to a second finger 57 and that a second tappet 23 supports the second finger 57.

The lifting device 1 comprises two guide rails 8 of the plateau 6. The position in X and in Y of the plateau 6 is determined by the guide rails 8. Alternatively, one guide rail 8 can be sufficient. Each movable stabilizer 5 is guided by at least one guide rail 8. Each movable stabilizer 5 is provided with a member for cooperation with the corresponding guide rail 8, for example in the form of pads.

Figure 12:
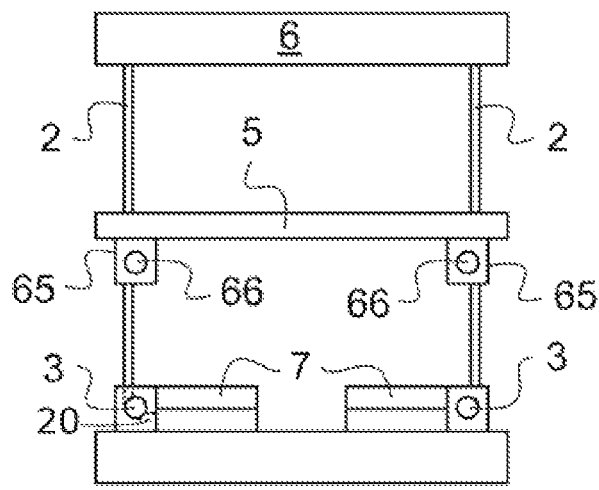
FIG. 12 is a view of a stabilizer supported by a lift column.

In the embodiment of FIG. 12, the stabilizer 5 is driven by an on-board motorization 65 on said stabilizer 5 and coupled to pinions 66 similar to the pinion 3. The stabilizer 5 is then able to be displaced in autonomy along lift columns 2. This embodiment makes it possible to adjust the height of the stabilizer 5 independently of the height of the plateau 6, for example for work that uses the stabilizer 5 as a work platform.

Figure 13:
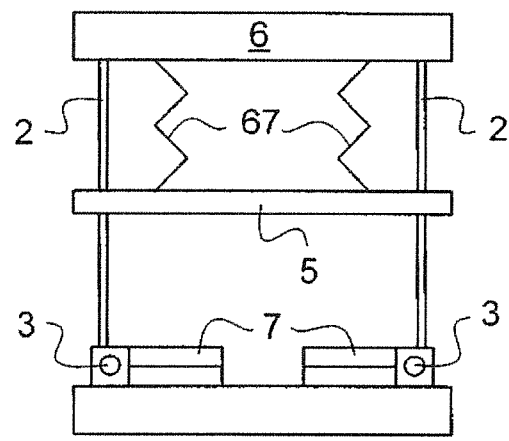
FIG. 13 is a view of a stabilizer supported by a plateau.

In the embodiment of FIG. 13, the stabilizer 5 is driven by a flexible connection 67 comprising an end fastened to the plateau 6 and an end fastened to the stabilizer 5.

Figure 14:
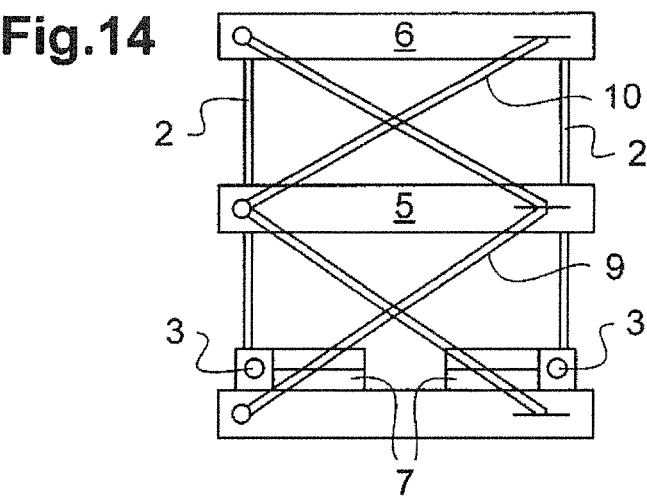
FIG. 14 is a view of a stabilizer supported by scissors.

In the embodiment of FIG. 14, the lifting device 1 comprises a lower pair of scissor supports 9 and an upper pair of scissor supports 10. The movable stabilizer 5 is mounted between said pairs of scissor supports. The lower pair of scissor supports 9 is mounted between the movable stabilizer 5 and the base. The upper pair of scissor supports 10 is mounted between the movable stabilizer 5 and the plateau 6.

Each pair of scissor supports 9, 10 has a structure as an articulated X at the center thereof, at a lower end and at an upper end and slidably mounted limited at the other lower end and at the other upper end. The displacement of the plateau 6 drives the upper pair of scissor supports 10, then once the latter is in sliding abutment, the movable stabilizer 5 and the lower pair of scissor supports 9. The pairs of scissor supports 9, 10 provide suitable spaced, excellent lateral stability.

Figure 15:
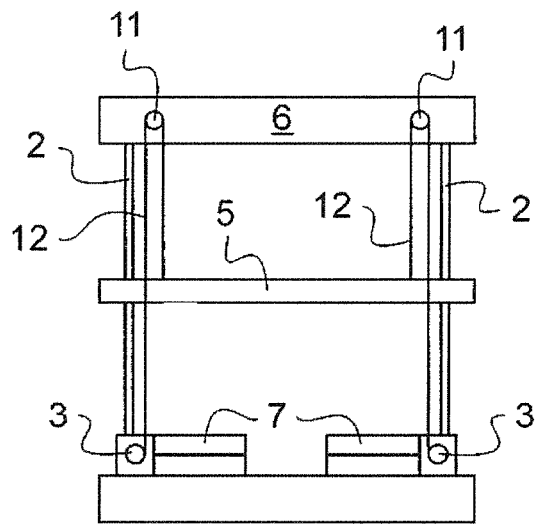
FIG. 15 is a view of a stabilizer supported by cables.

In the embodiment of FIG. 15, the lifting device 1 comprises a pulley and cable mechanism that drives the movable stabilizer 5. The pulley and cable mechanism comprises a pulley 11 mounted freely on the plateau 6 and a cable 12 that passes through the pulley 11 and fastened at one end to the movable stabilizer 5 and at the other end to a stationary portion of the lifting device 1, near the base. The length of the cable 12 is such that the movable stabilizer 5 is located at mid-height when the plateau 6 is in the high position. Alternatively, said other end is driven by the shaft of the pinion 3, coupled to a winding drum.

Figure 16:
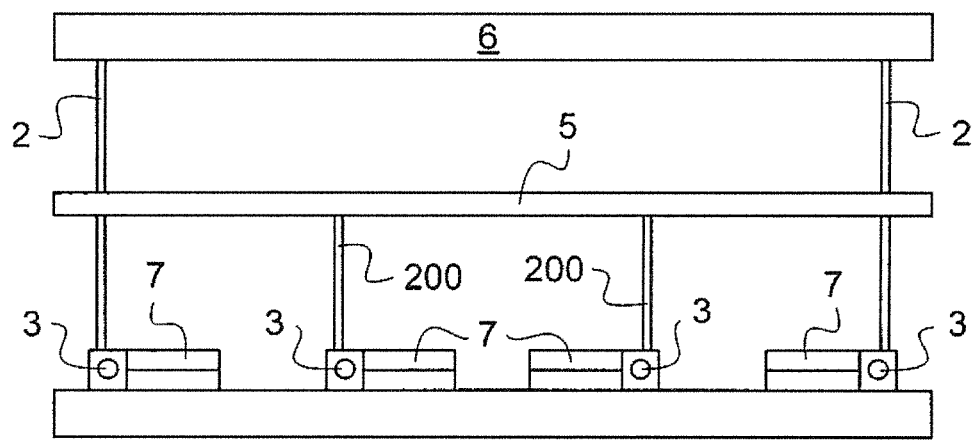
FIG. 16 is a view of a stabilizer supported by a lift column.

In the embodiment of FIG. 16, the lifting device 1 comprises at least two additional lift columns 200 dedicated to the movable stabilizer 5. The movable stabilizer 5 is independent in height of the plateau 6 and of the lift columns 2 that support the plateau 6. The reduced stroke and the low mass of the movable stabilizer 5 make it possible for the lift columns 200 to be of a reduced model in relation to the model of the lift columns 2. Advantageously, the orientations of the lift columns 200 in relation to the lift columns 2 are chosen for good stability.

Figure 17:
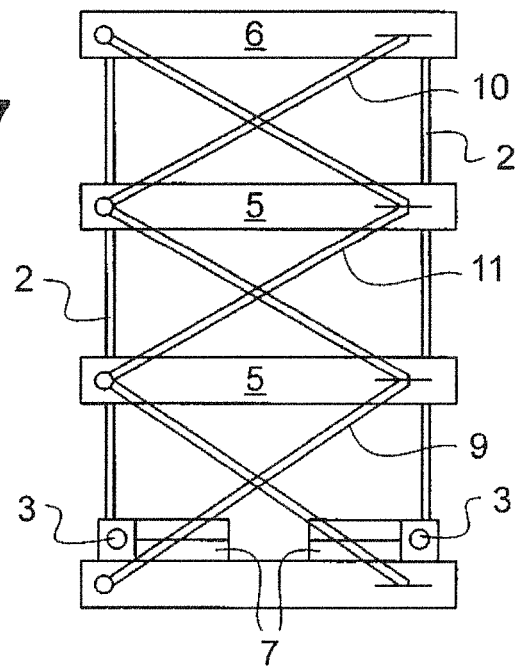
FIG. 17 is a view of a device with several stabilizers supported by a lift column.

The embodiment of FIG. 17 is similar to the embodiment of FIG. 14, the lifting device 1 comprising two movable stabilizers 5 and three pairs of scissor supports, lower 9, intermediate 11 and upper 10. Each movable stabilizer 5 is mounted between two pairs of scissor supports. A displacement with a high stroke is obtained.

In the embodiments shown, the lifting device 1 comprises at least two, for example four, articulated lift columns 2 each provided with at least one meshing part 20, and with at least one arm 21 directed upward from the meshing part 20. Each lift column 2 is made up of links 22 with a link of rank 1 at the upper end of the upwardly directed arm 21 and running links of rank n, with n comprised between 2 and N the number of links 22 of the lift column. The lifting device 1 comprises at least two, for example four, rotary pinions 3 each driving the corresponding lift column 2 by said meshing part 20 meshing with the pinion 3. The lifting device 1 comprises at least two, for example four, arms 4 opposite the upwardly directly arms respectively and formed from resting links 22. Said resting links 22 are able to pass to the meshing parts and to the upwardly directed arms by rotation of the corresponding pinion 3. The lifting device 1 comprises at least one movable stabilizer 5 along said upwardly directed arms. The movable stabilizer 5 is able to be driven by each one of the lift columns 2.

Each movable stabilizer 5 is disposed in the vicinity of the link of rank B/(p+1) or multiple of B/(p+1), in the high position of the lifting device, with B the number of links 22 of the upwardly directed arm 21 in the high position of the lifting device, and p the number of movable stabilizers, preferably p being equal to 1, 2 or 3.

The invention claimed is:

1. A thrust lifting device, adapted to transmit a thrust force allowing for lifting of loads, comprising:
   at least one articulated lift column provided with at least one meshing part, and with at least one arm directed upward from the at least one meshing part, the at least one lift column being made up of links with a link of rank 1 at the upper end of the upwardly directed arm and running links of rank n, with n comprised between 2 and N, wherein N is the number of links of the at least one lift column,
   at least one rotary pinion driving the at least one lift column by said at least one meshing part meshing with the at least one pinion,
   at least one second arm orthogonal to the at least one upwardly directed arm and formed by resting links, said resting links being able to pass to the at least one meshing part and to the at least one upwardly directed arm by rotation of the at least one pinion, and
   at least one movable stabilizer that is movable along the at least one upwardly directed arm, wherein each lift column comprises at least one tappet per each movable stabilizer of the at least one movable stabilizer, the tappet configured to support said movable stabilizer by bearing on a stabilizer finger, the tappet being supported by at least two link axes when the tappet encounters the stabilizer finger by an upper surface thereof, the stabilizer finger displaceable with respect to the stabilizer, with dampening of said displacement by a damper.

2. The device according to claim 1, wherein each lift column comprises at least two tappets per each movable stabilizer of the at least one movable stabilizer, the at least two tappets of each lift column being disposed with an offset in a horizontal plane in such a way that a first tappet supports a first finger after having passed next to a second finger and that a second tappet supports the second finger.

3. The device according to claim 1, wherein each movable stabilizer is guided by at least one guide rail of a platform of the lifting device.

4. The device according to claim 1, further comprising a lower pair of scissor supports and an upper pair of scissor supports, the movable stabilizer being mounted between said pairs of scissor supports.

5. The device according to claim 1, wherein said second arm stores the resting links, linearly or in a wound manner.

6. The device according to claim 1, wherein each link comprises at least one cheek, of rectangular shape, of a constant thickness perpendicular to the main plane thereof, the cheek being:
a simple flat superimposed in thickness, or
a pressed flat with an offset in thickness.

7. The device according to claim 1, wherein the at least one articulated lift column comprises at least two articulated lift columns each provided with the at least one meshing part, and with the at least one arm directed upward from the at least one meshing part, each lift column being made up of links with a link of rank 1 at the upper end of the upwardly directed arm and running links of rank n, with n comprised between 2 and N the number of links of the at least one lift column,
wherein the at least one rotary pinion comprises at least two rotary pinions, each articulated lift column comprising one of the at least two rotary pinions each driving a corresponding lift column by said meshing part meshing with the at least one rotary pinion,
wherein the at least one second arm comprises at least two second arms each of the at least two second arms being orthogonal to the at least one upwardly directed arm respectively and formed from resting links, said resting links to pass to the meshing parts and to the upwardly directed arms by rotation of the at least one pinion, and
at least one movable stabilizer along said at least one upwardly directed arms.

8. A thrust lifting device, adapted to transmit a thrust force allowing for lifting of loads, comprising:
at least one articulated lift column provided with at least one meshing part, and with at least one arm directed upward from the at least one meshing part, the at least one lift column being made up of links with a link of rank 1 at the upper end of the upwardly directed arm and running links of rank n, with n comprised between 2 and N, wherein N is the number of links of the at least one lift column,
at least one rotary pinion driving the at least one lift column by said at least one meshing part meshing with the at least one pinion,
at least one second arm opposite the at least one upwardly directed arm and formed by resting links, said resting links being able to pass to the at least one meshing part and to the at least one upwardly directed arm by rotation of the at least one pinion, and
at least one movable stabilizer that is movable along the at least one upwardly directed arm, wherein each of said at least one movable stabilizer comprises one ring per each of said at least one articulated lift column and a frame rigidly connected to the ring, said ring comprising a sliding member with respect to the corresponding lift column and a stabilizer finger for driving the at least one movable stabilizer in motion, the stabilizer finger configured to bear against the corresponding lift column when the tappet encounters the stabilizer finger, by an upper surface thereof, the stabilizer finger displaceable with respect to the sliding member with dampening of said displacement by a damper.

9. The device according to claim 8, wherein the sliding member forms a link guide, in contact with two links of said links.

10. The device according to claim 9, wherein the sliding member forms a roller guide.

11. The device according to claim 10, wherein the roller guide is in contact with at least three rollers.

12. The device according to claim 8, wherein the sliding member is disposed between two rows of rollers or on either side of a row of rollers.

13. The device according to claim 8, wherein the sliding member forms a link cheek guide, the sliding member being in contact with two links of said links over a portion of a height of each one of the two links, or a column pad guide, and wherein pads are fastened to said links or to link bars.

14. The device according to claim 8, wherein each movable stabilizer comprises the damper per lift column, the damper reducing an acceleration of the movable stabilizer when the stabilizer finger comes into contact with the lift column, and reducing the acceleration of the movable stabilizer when the movable stabilizer arrives in a low position.

15. The device according to claim 8, wherein each movable stabilizer of the at least one movable stabilizer is guided by at least one guide rail of a platform of the lifting device.

16. The device according to claim 8, further comprising a lower pair of scissor supports and an upper pair of scissor supports, the movable stabilizer being mounted between said pairs of scissor supports.

17. The device according to claim 8, wherein said opposite second arm stores the resting links, linearly or in a wound manner.

18. The device according to claim 8, wherein each link comprises at least one cheek, of rectangular shape, of a constant thickness perpendicular to the main plane thereof, the at least one cheek being:
a simple flat superimposed in thickness, or
a pressed flat with an offset in thickness.

19. The device according to claim 8, wherein each link comprises at least one cheek, of rectangular shape, of a constant thickness perpendicular to the main plane thereof, the at least one cheek being a machined part.

* * * * *